(12) United States Patent
Papple

(10) Patent No.: US 7,300,250 B2
(45) Date of Patent: Nov. 27, 2007

(54) COOLED AIRFOIL TRAILING EDGE TIP EXIT

(75) Inventor: Michael Papple, Ile des Soeurs (CA)

(73) Assignee: Pratt & Whitney Canada Corp., Longueil, Quebec (CA)

( * ) Notice: Subject to any disclaimer, the term of this patent is extended or adjusted under 35 U.S.C. 154(b) by 87 days.

(21) Appl. No.: 11/236,572

(22) Filed: Sep. 28, 2005

(65) Prior Publication Data

US 2007/0071601 A1  Mar. 29, 2007

(51) Int. Cl.
F01D 5/18 (2006.01)
(52) U.S. Cl. .................... 416/96 R; 416/97 R
(58) Field of Classification Search ........... 415/115, 415/116; 416/96 R, 97 R, 97 A, 95, 90 R
See application file for complete search history.

(56) References Cited

U.S. PATENT DOCUMENTS

| | | |
|---|---|---|
| 3,934,322 A | 1/1976 | Hauser et al. |
| 4,257,737 A | 3/1981 | Andress et al. |
| 4,753,575 A | 6/1988 | Levengood et al. |
| 4,767,268 A | 8/1988 | Auxier et al. |
| 5,125,798 A | 6/1992 | Muth et al. |
| 5,203,873 A | 4/1993 | Corsmeier et al. |
| 5,246,341 A | 9/1993 | Hall et al. |
| 5,403,159 A | 4/1995 | Green et al. |
| 5,462,405 A | 10/1995 | Hoff et al. |
| 5,511,946 A | 4/1996 | Lee et al. |
| 5,564,902 A | 10/1996 | Tomita |
| 6,019,579 A | 2/2000 | Fukuno et al. |
| 6,231,307 B1 | 5/2001 | Correia |
| 6,561,758 B2 | 5/2003 | Rinck et al. |
| 6,824,359 B2 | 11/2004 | Chlus et al. |
| 2003/0059304 A1 | 3/2003 | Leeke et al. |
| 2005/0281671 A1* | 12/2005 | Liang ............... 416/1 |

* cited by examiner

Primary Examiner—Edward K. Look
Assistant Examiner—Dwayne J White
(74) Attorney, Agent, or Firm—Ogilvy Renault LLP

(57) ABSTRACT

A gas turbine engine airfoil comprises first and second opposite sides joined together at spaced-apart leading and trailing edges and extending from a root to a tip. An internal cooling passage is provided for channelling coolant through the airfoil. The internal cooling passage has a discharge aperture at a juncture of the tip and the trailing edge. The discharge aperture has a tip component and a trailing edge component to provide for effective cooling of the trailing tip corner region of the airfoil.

16 Claims, 5 Drawing Sheets

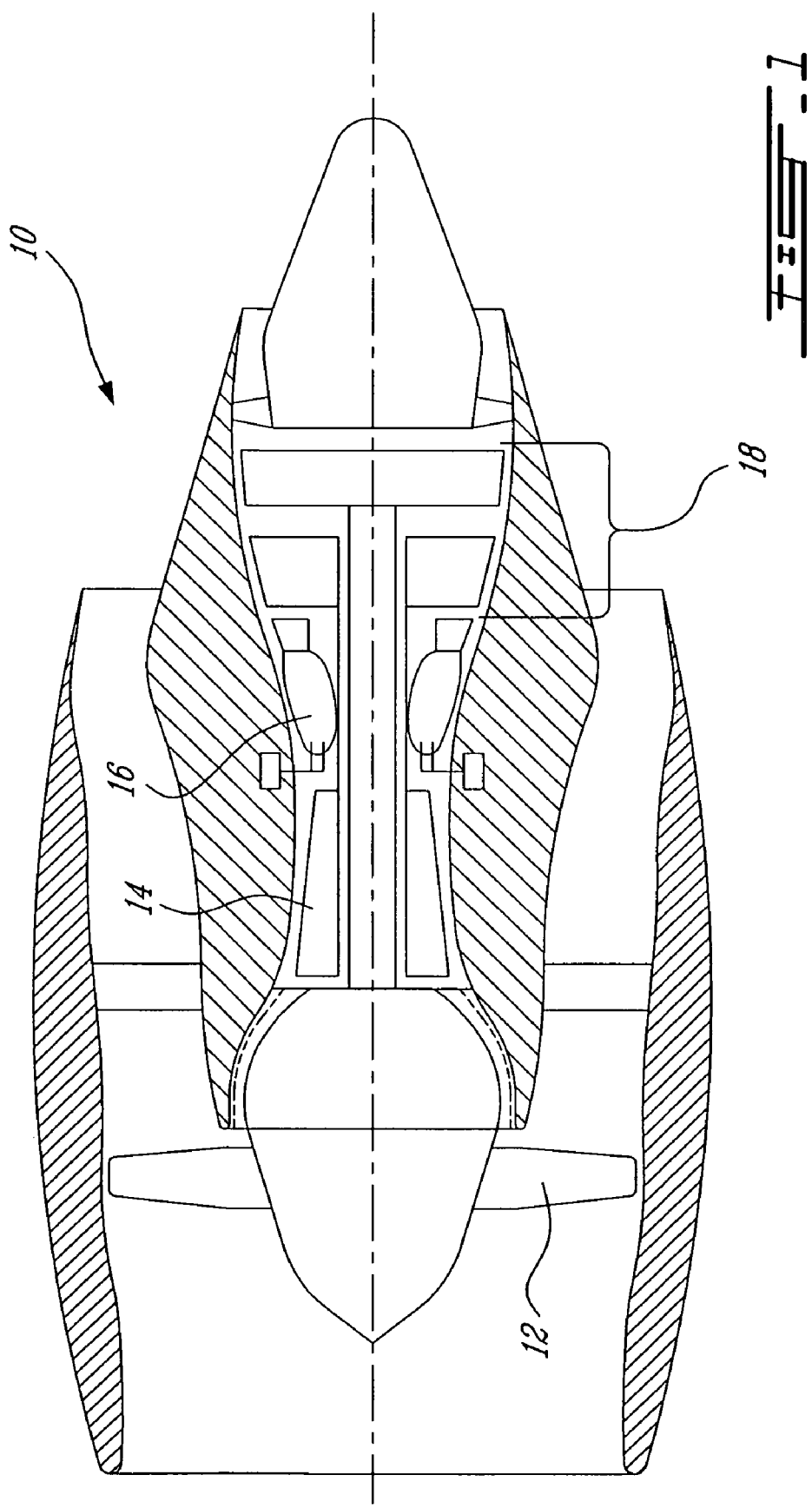

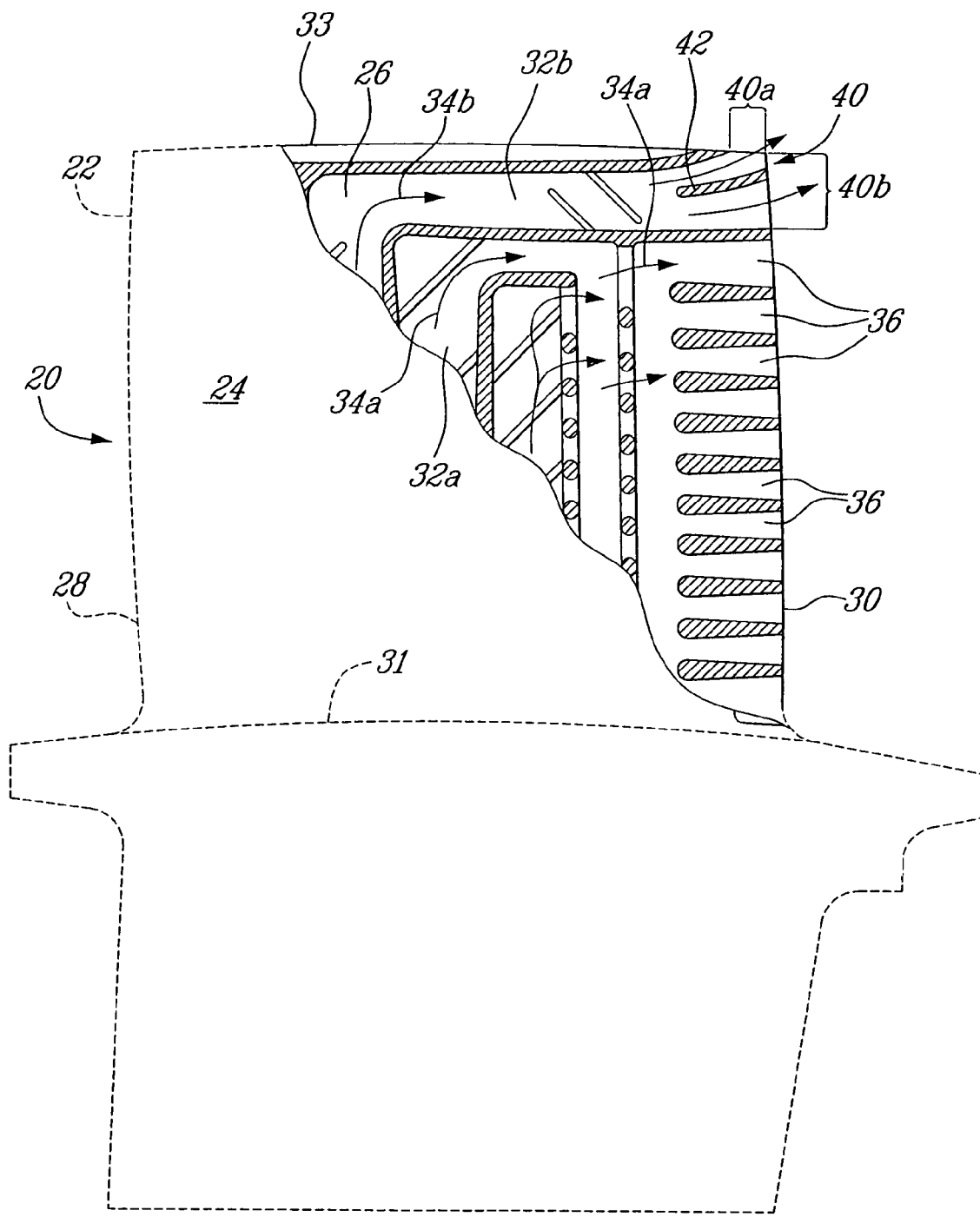

COOLED AIRFOIL TRAILING EDGE TIP EXIT

TECHNICAL FIELD

The invention relates generally to gas turbine engines and, more particularly, to cooling of airfoil trailing edge tip corners.

BACKGROUND OF THE ART

The intersection between an airfoil trailing edge and an airfoil tip defines a trailing edge tip corner. The cooling of such a trailing edge tip corner has always been challenging. The various solutions which have been proposed heretofore are not fully satisfactory either from a performance or a manufacturing point of view.

Accordingly, there is still a need to provide means for more effectively cooling of blade trailing edge tip corners.

SUMMARY OF THE INVENTION

It is therefore an object of this invention to provide an efficient means for cooling of the trailing edge tip corner of an airfoil for a gas turbine engine.

In one aspect, the present invention provides a gas turbine engine airfoil comprising: first and second opposite sides joined together at spaced-apart leading and trailing edges and extending from a root to a tip, an internal cooling passage for channelling coolant therethrough, said internal cooling passage having a discharge aperture at a juncture of said tip and said trailing edge, said discharge aperture having a tip component and a trailing edge component.

In another aspect, the present invention provides an internally cooled turbine airfoil comprising an airfoil body having a leading edge and a trailing edge extending spanwise between a root and a tip, a cooling passage extending through said airfoil body and having a trailing edge tip exit, said trailing edge tip exit extending through both said tip and said trailing edge.

In another aspect, the present invention provides a method of improving the cooling of a trailing edge tip region of a gas turbine engine airfoil, comprising the step of radially widening a trailing edge discharge opening through a trailing tip corner of the airfoil, the trailing edge discharge opening extending through both the tip and the trailing edge of the airfoil.

In another aspect, the present invention provides a method of manufacturing an airfoil for a gas turbine engine, comprising defining a cooling passage in the airfoil, and extending the cooling passage through a trailing tip corner of the airfoil to provide a discharge aperture at an intersection between a trailing edge and a tip of the airfoil, the discharge aperture being partly defined in both the trailing edge and the airfoil.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 1 is a schematic side view of a gas turbine engine, in partial cross-section;

FIG. 2b is a partial sectional view of the turbine blade in accordance with an embodiment of the present invention;

DETAILED DESCRIPTION OF THE PREFERRED EMBODIMENTS

Figure 2A:
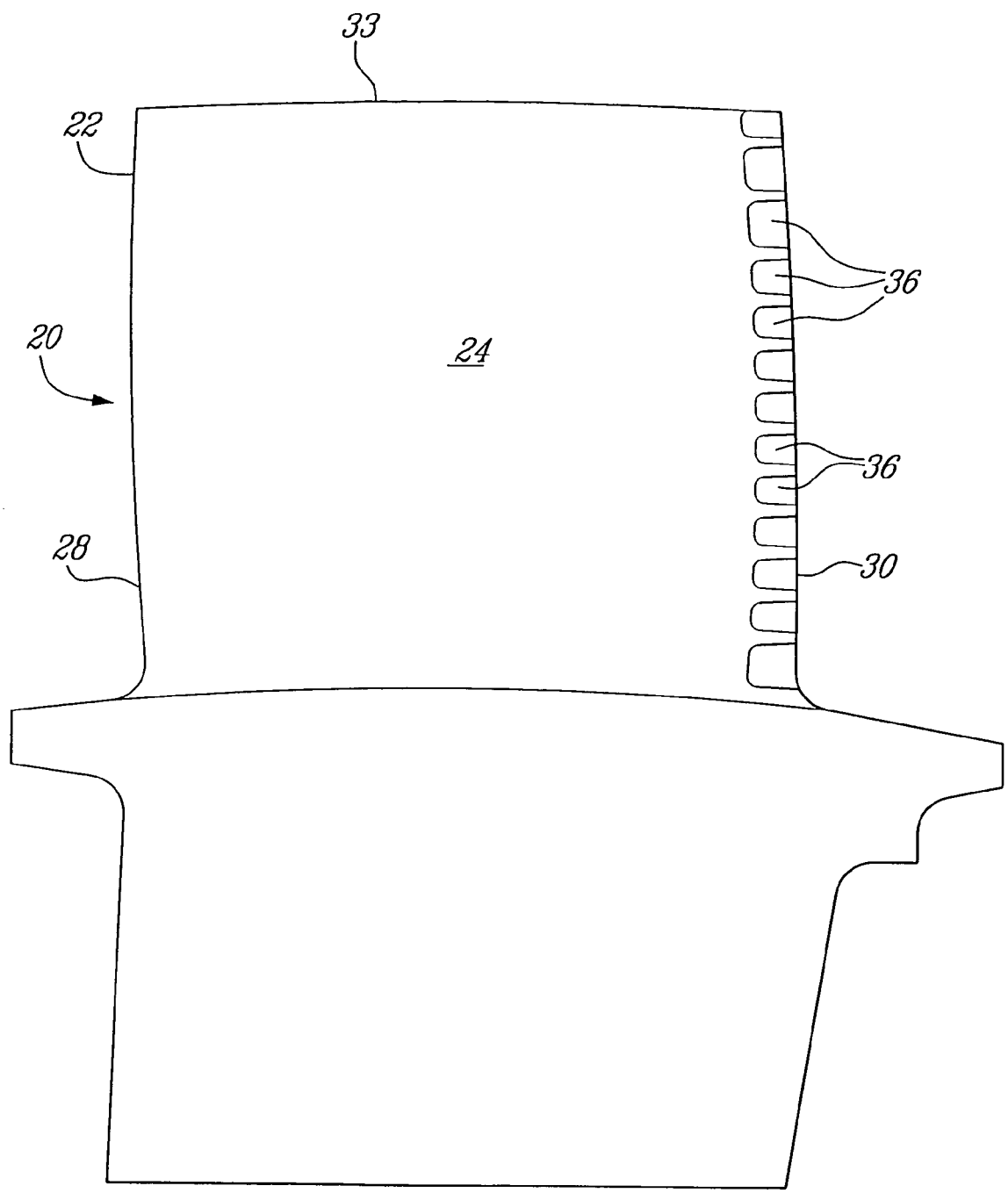
FIG. 2a is an elevation view of a turbine blade.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The turbine section 18 comprises one or more stages of stationary vanes and rotating blades. The present invention is particularly applicable to the latter type of airfoils, i.e. the rotating blades, one of which is generally designated by numeral 20 in FIGS. 2a and 2b. In FIG. 2b, a portion of the pressure side wall 24 has been removed to reveal an internal cooling circuit.

The turbine blade 20 comprises an airfoil 22 over which flows hot combustion gases emanating from the combustor 16. The airfoil 22 generally comprises a pressure side wall 24 and a suction side wall 26 extending chordwise between radially extending leading and trailing edges 28 and 30 and spanwise between a root 31 and a tip 33. The airfoil 22 defines between the pressure side wall 24 and the suction side wall 26 an internal cooling circuit 32 through which coolant, such as cooling air bled from the compressor 14, flows to convectively cool the airfoil 22, as depicted by arrows 34a and 34b in FIG. 2b.

The internal cooling circuit 32 may comprise among others an aft spanwise extending passage 32a and a chordwise extending tip passage 32b (also known as a "tip flag" passage) for independently receiving separate coolant flows. The mass of coolant fed into passage 32a is discharged from the airfoil trailing edge 30 into the main gas path of the engine 10 via a plurality of exit apertures 36 defined at selected radially spaced-apart locations through the trailing edge 30 of the airfoil 22. The tip passage 32b receives a separate flow of coolant, which is discharged through the trailing edge tip corner of the airfoil 22 that is at the juncture of the trailing edge and the tip 33.

As shown in FIG. 2b, the tip passage 32b extends completely through the trailing edge tip corner of the airfoil 22, thereby providing for a non-solid trailing tip corner. More particularly, the tip passage 32b has an outlet or exit aperture 40 extending through both the tip 33 and the trailing edge 30 for discharging the coolant in the tip passage 32b through both the tip 33 and the trailing edge 30. As can be appreciated from FIG. 2b, the tip passage 32b gradually becomes radially wider towards the exit aperture 40. Radially widening the exit aperture 40 of the tip passage 32b provides enhanced cooling of the trailing edge tip region of the blade 20 while substantially preserving the aerodynamic properties thereof. The quantity of coolant flowing through the trailing edge tip region of the airfoil 20 could also be adjusted by expanding the exit aperture 40 in a direction perpendicular to the pressure and suction side walls 24 and 26, but this would make the airfoil thicker at the trailing edge tip corner and have an aerodynamic penalty.

The exit aperture 40 has a tip component 40a and trailing edge component 40b. The trailing edge component 40b is typically longer than the tip component 40a. In the illustrated embodiment all of the coolant flowing through the tip passage 32b is discharged through the exit aperture 40, the major portion of the coolant flowing over the trailing edge component 40b of the exit aperture 40.

The exit aperture 40 is designed to be radially wider than the trailing edge exit apertures 36. This provides added heat exchange surface area where the airfoil 22 is more thermally solicited and, thus, prevents the formation of hot spot at the trailing tip corner of the airfoil 22.

A guide support 42 preferably extends from the trailing edge 30 into the tip passage 32b between walls 24 and 26 to guide a portion of the coolant flow towards the tip 33. The guide support 42 also reinforces the blade trailing edge tip region that has been weakened by the removal of solid material therefrom (hollow trailing tip corner configuration). The removal of solid material from the trailing edge tip region is beneficial in that it facilitates the cooling of the trailing edge tip corner. It also contributes to simplify the overall manufacturing process of the blade 20. There is no longer any need to drill several elongated holes or passages though a solid tip corner of the airfoil.

In use, coolant is fed into the blade 20 and circulated therethrough before being discharged through the exit aperture 40 and the trailing edge apertures 30. According to the illustrated embodiment, separate coolant flows are received in spanwise passage 32a and the tip passage 32b. The coolant flow in the tip passage 32b is discharged through aperture 40 at the trailing tip corner of the blade 20, whereas the coolant flow flowing through the spanwise passage 32a is discharged through the trailing edge apertures 36. The two flows can be provided and discharged at different pressures. Coolant flow may also be discharged through numerous holes in the airfoil (not shown).

Figure 3:
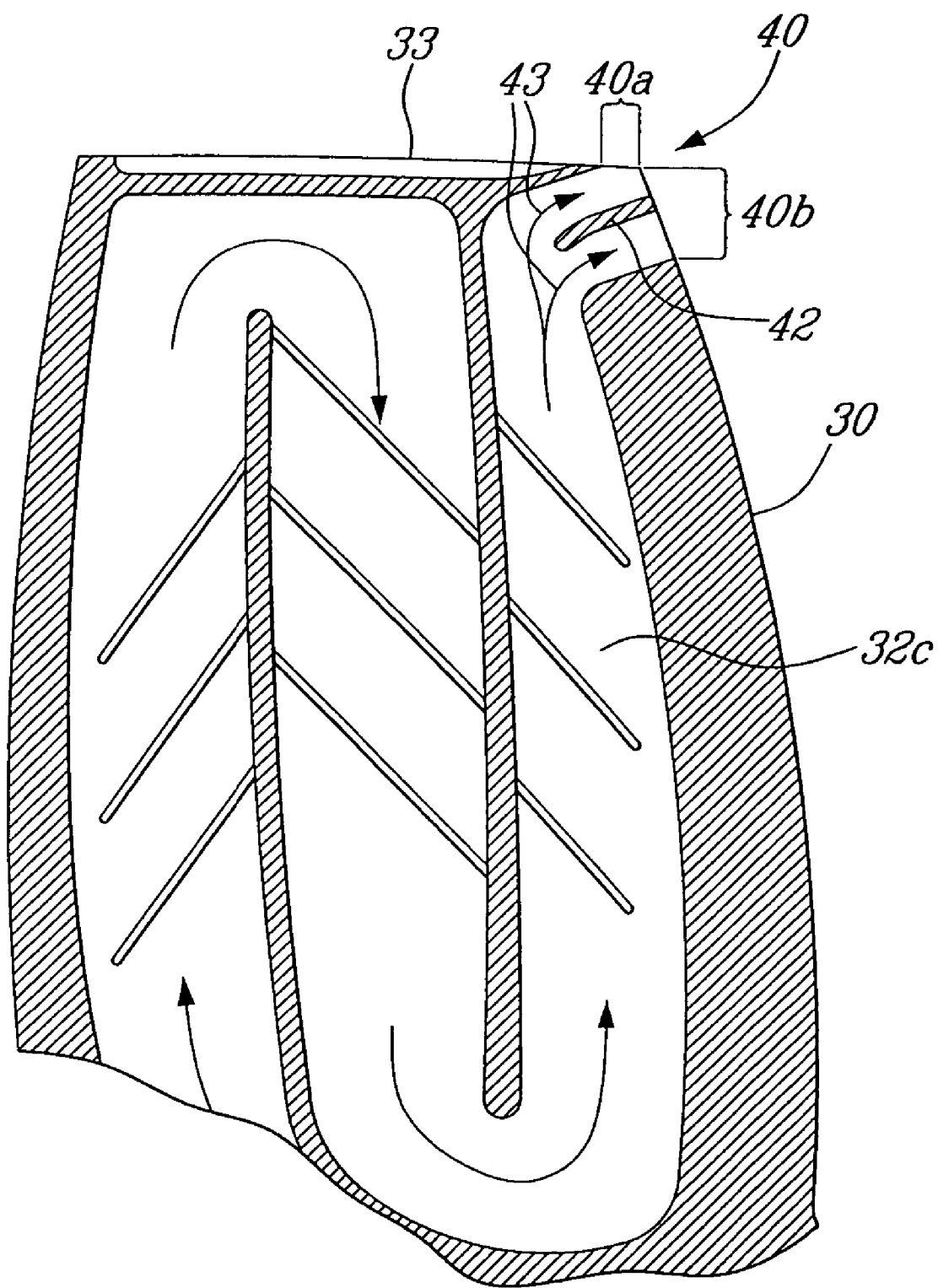
FIG. 3 is an enlarged cross-sectional view of an airfoil showing an alternative cooling scheme.

FIG. 3 illustrates an alternative cooling scheme wherein the coolant discharged through the trailing tip corner aperture 40 is channelled through a spanwise extending trailing edge passage 32c instead of a tip flag passage. The trailing edge passage 32c is extended through the blade trailing edge tip corner to provide exit aperture 40 with a tip component 40a and a trailing edge component 40b so that, in use, a portion of the coolant flows out the tip 33, while the reminders flows out the trailing edge 30, as illustrated by arrows 43.

Figure 4:
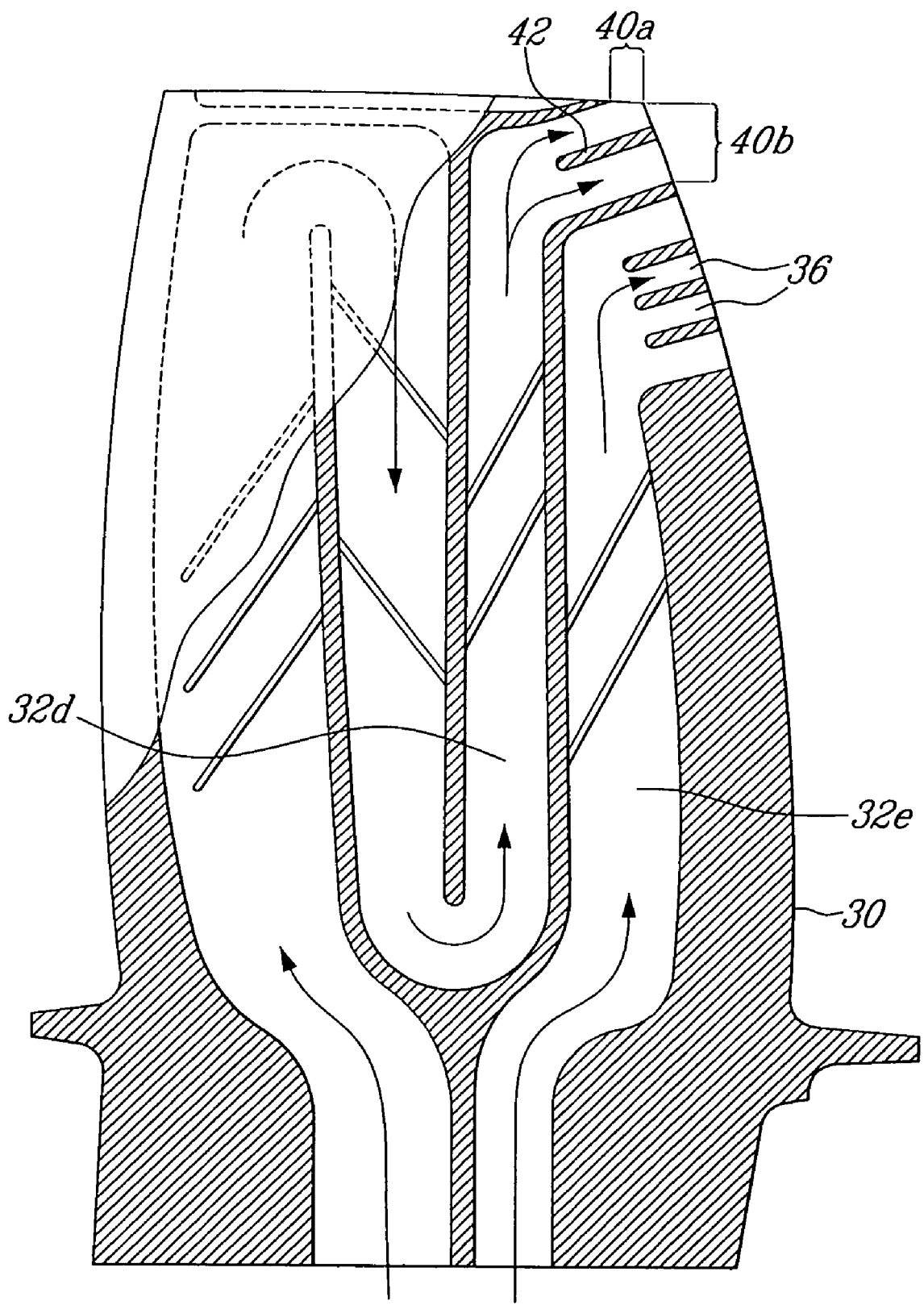
FIG. 4 is an enlarged cross-sectional view of an airfoil showing a further alternative cooling scheme.

FIG. 4 illustrates another possible cooling scheme comprising two separate cooling channels 32d and 32e. The coolant received in the first channel 32d is discharged through aperture 40 at the blade trailing tip corner, whereas the coolant fed into the second channel 32e is discharged through a number of trailing edge apertures 36 defined in the blade trailing edge 30. The exit aperture 40 constitutes the distal end of the rearmost spanwise leg of the first channel 32d and has a tip component 40a and a trailing edge component 40b. By so extending the rear spanwise leg of the first channel 32d completely through the blade trailing tip corner, the quantity of solid material at the blade trailing tip corner can be significantly reduced to provide a hollow configuration, which facilitates the cooling of the blade trailing tip corner.

The above description is meant to be exemplary only, and one skilled in the art will recognize that changes may be made to the embodiments described without department from the scope of the invention disclosed. For example, other non-illustrated cooling schemes could be used as well. Still other modifications which fall within the scope of the present invention will be apparent to those skilled in the art, in light of a review of this disclosure, and such modifications are intended to fall within the appended claims.

The invention claimed is:

1. A gas turbine engine airfoil comprising: first and second opposite sides joined together at spaced-apart leading and trailing edges and extending from a root to a tip, an internal cooling passage for channelling coolant therethrough, said internal cooling passage having a discharge aperture at a juncture of said tip and said trailing edge, said discharge aperture having a tip component and a trailing edge component, wherein the juncture of the tip and the trailing edge defines a non-solid trailing edge tip corner.

2. The gas turbine engine airfoil defined in claim 1, wherein said discharge aperture is provided at a distal end of a chordwise extending tip portion of said internal cooling passage.

3. The gas turbine engine airfoil defined in claim 1, wherein said discharge aperture is provided at one end of a spanwise extending portion of said internal cooling passage.

4. The gas turbine engine airfoil defined in claim 1, wherein said cooling passage radially widens through said non-solid trailing edge tip corner.

5. The gas turbine engine airfoil defined in claim 1, wherein said discharge aperture is split in two by a guide support extending from the trailing edge into the internal cooling passage, said guide support being spaced from the juncture of the tip and the trailing edge to provide a corner-free area.

6. An internally cooled turbine airfoil comprising an airfoil body having a leading edge and a trailing edge extending spanwise between a root and a tip, a cooling passage extending through said airfoil body and having a trailing edge tip exit, said trailing edge tip exit extending through both said tip and said trailing edge, and wherein a plurality of trailing edge discharge apertures are provided along the trailing edge, and wherein said trailing edge tin exit has a treater cross-sectional area than that of said trailing edge discharge apertures.

7. The internally cooled turbine airfoil as defined in claim 6, wherein said trailing edge and said tip defines a corner, and wherein said corner is substantially hollow.

8. The internally cooled turbine airfoil defined in claim 6, wherein said cooling passage becomes wider at said trailing edge tip exit thereof.

9. The internally cooled turbine airfoil defined in claim 6, wherein the trailing edge tip exit has substantially the same width as said cooling passage.

10. The internally cooled turbine airfoil defined in claim 6, wherein said trading edge tip exit extends at an angle through both said trailing edge and said tip.

11. The internally cooled turbine airfoil defined in claim 6, wherein a guide support splits said trailing edge tip exit into first and second leg portions, said first leg portion extending solely through said trailing edge, whereas said second leg portion extends through both said tip and said mailing edge.

12. The internally cooled turbine airfoil defined in claim 6, wherein said trailing edge tip exit extends over a longer extent of said trailing edge than over said tip.

13. A method of improving cooling of a trailing edge tip region of a gas turbine engine airfoil, comprising: radially widening a trailing edge discharge opening through a trailing tip corner of the airfoil, the trailing edge discharge opening extending through both the tip and the mailing edge of the airfoil, and reinforcing the trailing edge tip region with a guide support extending from the trailing edge into said trailing edge discharge opening, the guide support splitting the trailing edge discharge opening into first and second leg portions, the first leg portion extending solely through the trailing edge. whereas the second leg portion extends through both the tip and the trailing edge.

14. The method of claim 13, further comprising diverting a portion of the flow channelled to said trailing edge discharge aperture towards said tip.

15. A method of manufacturing an airfoil for a gas turbine engine, comprising defining a cooling passage in the airfoil, and extending the cooling passage through a trailing tip corner of the airfoil to provide a discharge aperture at an intersection between a trailing edge and a tip of the airfoil, the discharge aperture being partly defined in both the trailing edge and the tip of the airfoil and defining a void at the intersection therebetween.

16. The method defined in claim 15, further comprising reinforcing the trailing tip corner with a guide support extending from said trailing edge into said cooling passage, the guide support being spaced from said tip to leave said void at said intersection between the trailing edge and the tip of the airfoil.

\* \* \* \* \*

UNITED STATES PATENT AND TRADEMARK OFFICE
CERTIFICATE OF CORRECTION

| | |
|---|---|
| PATENT NO. | : 7,300,250 B2 |
| APPLICATION NO. | : 11/236572 |
| DATED | : November 27, 2007 |
| INVENTOR(S) | : Michael Papple |

It is certified that error appears in the above-identified patent and that said Letters Patent is hereby corrected as shown below:

In the claims:

Column 4, line 57, delete "mailing", insert --trailing--

Column 4, line 65, delete "mailing", insert --trailing--

Signed and Sealed this

Eighth Day of April, 2008

JON W. DUDAS
*Director of the United States Patent and Trademark Office*